(12) United States Patent
Kim et al.

(10) Patent No.: US 9,479,094 B2
(45) Date of Patent: Oct. 25, 2016

(54) APPARATUS AND METHOD FOR COMPENSATING FOR TORQUE FOR CURRENT ORDER OF DRIVING MOTOR

(71) Applicant: Hyundai Motor Company, Seoul (KR)

(72) Inventors: Young Un Kim, Gyeonggi-do (KR); Jeong Won Rho, Seoul (KR); Jae Sang Lim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 93 days.

(21) Appl. No.: 14/569,660

(22) Filed: Dec. 13, 2014

(65) Prior Publication Data

US 2016/0056738 A1 Feb. 25, 2016

(30) Foreign Application Priority Data

Aug. 25, 2014 (KR) ........................ 10-2014-0110942

(51) Int. Cl.
| | |
|---|---|
| *H02P 6/00* | (2016.01) |
| *H02P 6/08* | (2016.01) |
| *B60L 11/12* | (2006.01) |
| *B60L 15/02* | (2006.01) |
| *B60L 15/20* | (2006.01) |
| *H02P 21/00* | (2016.01) |
| *H02P 21/10* | (2016.01) |
| *H02P 21/14* | (2016.01) |

(52) U.S. Cl.
CPC ................. *H02P 6/08* (2013.01); *B60L 11/12* (2013.01); *B60L 15/025* (2013.01); *B60L 15/2045* (2013.01); *H02P 6/002* (2013.01); *H02P 21/0025* (2013.01); *H02P 21/10* (2013.01); *H02P 21/141* (2013.01); *Y02T 10/643* (2013.01); *Y02T 10/7077* (2013.01); *Y02T 10/72* (2013.01); *Y02T 10/7283* (2013.01)

(58) Field of Classification Search
CPC ............... H02P 21/0089; H02P 21/06; H02P 29/0066; H02P 21/141; H02P 21/12; H02P 21/14; H02P 2207/03; H02P 25/08; H02P 6/08; H02P 21/0003; H02P 21/0046; H02P 21/02; H02P 21/04; H02P 21/05
USPC ........... 318/400.15, 801, 719, 471, 472, 718
See application file for complete search history.

(56) References Cited

U.S. PATENT DOCUMENTS

| | | | | |
|---|---|---|---|---|
| 4,477,763 A | * | 10/1984 | Asano ..................... | H02M 7/48 318/807 |
| 5,341,081 A | * | 8/1994 | Yamada .................. | H02P 21/09 318/800 |

(Continued)

FOREIGN PATENT DOCUMENTS

| | | |
|---|---|---|
| JP | 7-067319 | 7/1995 |
| JP | 3339208 B2 | 10/2002 |

(Continued)

*Primary Examiner* — Paul Ip
(74) *Attorney, Agent, or Firm* — Mintz Levin Cohn Ferris Glovsky and Popeo, P.C.; Peter F. Corless

(57) ABSTRACT

An apparatus for compensating for a torque for a current order of a driving motor includes: a current order generator configured to: i) receive a torque order (Tref*), ii) generate a magnetic flux-based current order map using a generated driving point ratio (1/λmax), and iii) generate a current order using the generated current order map; and an iron loss torque compensator configured to extract an iron loss torque compensation value for the generated current order and a speed (Wrpm) of the driving motor.

5 Claims, 8 Drawing Sheets

(56) References Cited

U.S. PATENT DOCUMENTS

| | | | | |
|---|---|---|---|---|
| 5,594,670 A * | 1/1997 | Yamamoto | ............ | G01R 31/343 318/767 |
| 6,208,109 B1 * | 3/2001 | Yamai | ............ | H02P 6/10 318/430 |
| 6,700,400 B2 * | 3/2004 | Atarashi | ............ | B60L 11/1803 318/400.01 |
| 7,408,312 B2 * | 8/2008 | Itou | ............ | H02P 21/02 318/400.02 |
| 7,557,527 B2 * | 7/2009 | Yoshimoto | ............ | B60L 15/025 318/139 |
| 7,696,709 B2 * | 4/2010 | Endo | ............ | B62D 5/0472 318/432 |
| 7,710,066 B2 * | 5/2010 | Hashimoto | ............ | H02P 21/05 318/400.01 |
| 7,830,106 B2 * | 11/2010 | Fukuchi | ............ | 318/400.02 |
| 8,281,886 B2 * | 10/2012 | Saha | ............ | B60L 15/025 180/65.285 |
| 8,674,647 B2 * | 3/2014 | Iwaji | ............ | B60L 15/025 318/400.01 |
| 8,686,673 B2 * | 4/2014 | Matsuki | ............ | H02P 21/145 318/400.02 |
| 8,698,434 B2 * | 4/2014 | Akasako | ............ | H02P 6/08 318/400.01 |
| 8,716,965 B2 * | 5/2014 | Iwashita | ............ | H02P 21/0046 318/400.01 |
| 8,829,830 B2 * | 9/2014 | Kobayashi | ............ | H02P 21/141 318/400.01 |
| 8,860,356 B2 * | 10/2014 | Yuuki | ............ | B60L 15/025 318/432 |
| 8,912,739 B2 * | 12/2014 | Kobayashi | ............ | H02P 21/141 318/400.02 |
| 8,975,841 B2 * | 3/2015 | Maekawa | ............ | H02P 21/14 318/400.02 |
| 2002/0113615 A1 * | 8/2002 | Atarashi | ............ | B60L 11/1803 318/400.01 |
| 2005/0237013 A1 * | 10/2005 | Maslov | ............ | H02P 27/06 318/400.18 |
| 2006/0273748 A1 * | 12/2006 | Yoshimoto | ............ | B60L 15/025 318/432 |
| 2007/0096672 A1 * | 5/2007 | Endo | ............ | B62D 5/0472 318/432 |
| 2007/0200528 A1 * | 8/2007 | Itou | ............ | H02P 21/02 318/719 |
| 2008/0030163 A1 * | 2/2008 | Fukuchi | ............ | 318/801 |
| 2009/0153087 A1 | 6/2009 | Lim et al. | | |
| 2010/0140003 A1 * | 6/2010 | Saha | ............ | B60L 15/025 180/65.285 |
| 2010/0201294 A1 * | 8/2010 | Yuuki | ............ | B60L 15/025 318/400.3 |
| 2012/0081054 A1 * | 4/2012 | Hisada | ............ | H02P 23/009 318/400.41 |
| 2013/0088179 A1 | 4/2013 | Kobayashi et al. | | |
| 2013/0093371 A1 * | 4/2013 | Akasako | ............ | H02P 6/08 318/400.02 |
| 2013/0147417 A1 | 6/2013 | Kim et al. | | |
| 2013/0249448 A1 * | 9/2013 | Kobayashi | ............ | H02P 21/141 318/400.02 |
| 2013/0257324 A1 * | 10/2013 | Maekawa | ............ | H02P 21/0089 318/400.02 |
| 2013/0328508 A1 | 12/2013 | Bae et al. | | |
| 2014/0001991 A1 | 1/2014 | Nishibata et al. | | |

FOREIGN PATENT DOCUMENTS

| | | |
|---|---|---|
| JP | 2013-121314 A | 6/2013 |
| KR | 10-2007-0018440 A | 2/2007 |
| KR | 10-2009-0062663 A | 6/2009 |
| KR | 10-1272955 B1 | 6/2013 |
| KR | 10-2013-0138999 A | 12/2013 |
| WO | H08331900 A | 12/1996 |

\* cited by examiner

APPARATUS AND METHOD FOR COMPENSATING FOR TORQUE FOR CURRENT ORDER OF DRIVING MOTOR

CROSS-REFERENCE TO RELATED APPLICATION

This application claims the benefit of and priority to Korean Patent Application No. 10-2014-0110942, filed on Aug. 25, 2014 in the Korean Intellectual Property Office, the disclosure of which is incorporated herein in its entirety by reference.

TECHNICAL FIELD

The present disclosure relates to an apparatus and a method for compensating for a torque of a current order of a driving motor, and more particularly, to a technology for compensating for an iron loss torque depending on a current magnitude according to a current driving point (i.e., current order) and a speed of a driving motor.

BACKGROUND

Characteristics of an inductance and a magnetic flux of a permanent magnet of a driving motor for a hybrid vehicle can be changed due to heat generated depending on an ambient temperature (e.g., engine room) and a driving condition. This has an influence on control characteristics (e.g., MTPA curve, weak field control, etc.) which can deteriorate torque control performance. Therefore, in order to optimize power performance and drivability of a hybrid vehicle, a method for compensating for a change in a torque depending on a change in a temperature of the driving motor is necessary.

A first conventional method for compensating for a change in a torque includes estimating a secondary resistance of a rotor for an induction motor, and then regenerating a current order through vector control calculation. A second conventional method for compensating for a change in a torque includes configuring n current control maps depending on a temperature and performing appropriate interpolation on current orders.

In the first conventional method, a control target motor is the induction motor, and a secondary resistance value of the rotor depending on a change in a temperature is estimated to generate the current orders. On the other hand, in the second conventional method, after the n current control maps depending on the temperature of a motor are configured, interpolation is performed on current orders at two reference temperatures close to an actual temperature of the motor at the time of applying a torque order to generate current orders in a current orderer.

That is, the second conventional method, it is necessary to configure the n current control maps depending on the temperature in order to implement a control scheme. It is also necessary to apply all of the current orders that may be combined with each other using a microcontroller unit (MCU) in all driving regions to measure a measured torque, and then calculate a maximum torque per ampere (MTPA) curve and a weak field control curve in order to configure one current control map.

However, it takes significant time and effort to configure the n current control maps by repeating the above-mentioned process n times.

SUMMARY

The present disclosure has been made to solve the above-mentioned problems occurring in the related art while advantages achieved by the related art are maintained intact.

An aspect of the present disclosure provides a technology for compensating for an iron loss torque of a temperature of a driving motor, a battery voltage, and a speed of the driving motor, and more particularly, an apparatus and a method for compensating for a torque of a current order of a driving motor that are capable of minimizing an error of a measured torque against a torque order for a speed and a temperature of the driving motor and a battery voltage. This may be accomplished by calculating a compensation torque depending on a current magnitude according to a current driving point (i.e., current order) and the speed of the driving motor. As a result, the techniques described herein are capable of improving fuel efficiency of a vehicle by decreasing current consumption of a battery.

According to embodiments of the present disclosure, an apparatus for compensating for a torque for a current order of a driving motor includes: a current order generator configured to: i) receive a torque order (Tref*), ii) generate a magnetic flux-based current order map using a generated driving point ratio ($1/\lambda max$), and iii) generate a current order using the generated current order map; and an iron loss torque compensator configured to extract an iron loss torque compensation value for the generated current order and a speed (Wrpm) of the driving motor.

The generated current order may include a d-axis current order (idref) and a q-axis current order (iqref).

The apparatus for compensating for a torque for a current order of a driving motor may further include a current controller configured to generate a voltage order from the generated current order.

The driving point ratio may be generated from a magnetic flux generator configured to receive an output voltage (Vdc) of a battery, an electrical angular velocity (Wr), and a voltage (Vdqref).

According to embodiments of the present disclosure, a method for compensating for a torque for a current order of a driving motor includes: receiving an output voltage (Vdc) of a battery providing driving power of the driving motor, an electrical angular velocity (Wr) of the driving motor, and a torque order (Tref*); generating a driving point ratio ($1/\lambda max$) from the received output voltage of the battery and the received electrical angular velocity of the driving motor; generating a current order using a magnetic flux-based current order map including the generated torque order and the generated driving point ratio; and generating a compensation torque order (Tcomp) using the generated current order and a speed (Wrpm) of the driving motor.

The method for compensating for a torque for a current order of a driving motor may further include generating a voltage order from the generated current order.

The method for compensating for a torque for a current order of a driving motor may further include feeding-back the generated voltage order to reflect the generated voltage order in the generating of the driving point ratio ($1/\lambda max$).

The generated current order may include a d-axis current order and a q-axis current order and may be calculated based on a current magnitude.

The method for compensating for a torque for a current order of a driving motor may further include generating a current order using a magnetic flux-based current order map including the generated compensation torque order and the generated driving point ratio.

According to embodiments of the present disclosure, a non-transitory computer readable medium containing program instructions for compensating for a torque for a current order of a driving motor includes: program instructions that receive an output voltage (Vdc) of a battery providing driving power of the driving motor, an electrical angular velocity (Wr) of the driving motor, and a torque order (Tref*); program instructions that generate a driving point ratio (1/λmax) from the received output voltage of the battery and the received electrical angular velocity of the driving motor; program instructions that generate a current order using a magnetic flux-based current order map including the torque order and the generated driving point ratio; and program instructions that generate a compensation torque order (Tcomp) using the generated current order and a speed (Wrpm) of the driving motor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
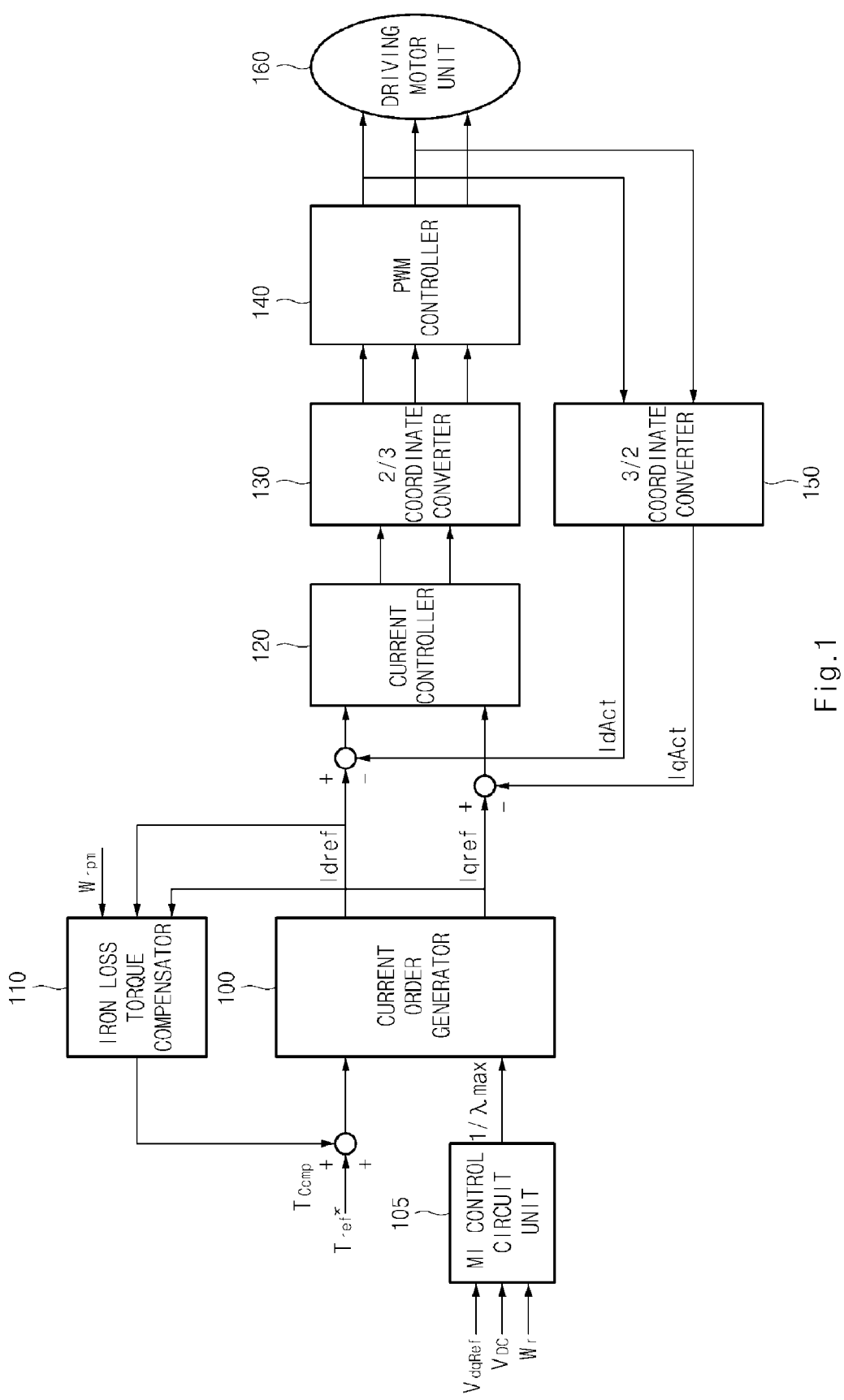
FIG. 1 is a configuration diagram for describing an apparatus and a method for compensating for a torque for a current order of a driving motor according to embodiments of the present disclosure.

The above-mentioned objects, features, and advantages will become more obvious from the following description described below in detail with reference to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted. Hereinafter, embodiments of the present disclosure will be described in detail with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for compensating for a torque of a current order of a driving motor.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a configuration diagram for describing an apparatus and a method for compensating for a torque for a current order of a driving motor according to embodiments of the present disclosure.

Referring to FIG. 1, an apparatus for compensating for a torque for a current order of a driving motor is configured to include: i) a current order generator 100 generating d-axis and q-axis current orders Idref and Iqref, ii) an iron loss torque compensator 110 extracting an iron loss torque compensation value for the d-axis and q-axis current orders Idref and Iqref generated by the current order generator and a speed Wrpm of the driving motor, iii) a current controller 120 generating d-axis and q-axis voltage orders Vdref and Vqref, iv) a 2/3 coordinate converter 130 in which a three-phase voltage order is obtained, v) a pulse width modulation (PWM) controller 140, and vi) a 3/2 coordinate converter 150 in which a d-axis feedback current Id and a q-axis feedback current Iq are obtained.

The current order generator 100 receives a torque order Tref* and generates a magnetic flux-based current order map based on a generated magnetic flux. The current order generator 100 generates a current order using the magnetic flux based current order map.

In detail, the d-axis and q-axis current orders Idref and Iqref are separately generated as the current order. Here, the magnetic flux may be called a driving point ratio (1/λ max). In addition, λ max is a ratio between an output voltage Vdc and an electrical angular velocity Wr and means a maximum magnetic flux.

In detail, the driving point ratio (1/λ max) may be generated from the output voltage Vdc of the battery providing driving power of the motor, the electrical angular velocity Wr, and a voltage Vd-qref fed-back from an inverter through a magnetic flux generator (e.g., an MI control circuit unit) 105.

A conventional current order map may use only two variables, that is, a speed of the motor and a torque order. However, in the present disclosure, three variables, that is, the electrical angular velocity Wr of the motor, the torque order Tref*, and the output voltage Vdc of the battery are received, and the magnetic flux-based current order map is generated using these three variables.

Here, describing a process of generating the magnetic flux-based current order map, a relationship between Id and Iq regions and a torque may be used.

In embodiments of the present disclosure, voltages and torques in a d-axis and a q-axis are measured depending on a current magnitude and an angle in a state in which the motor is controlled at a predetermined speed. These data are input to a map extracting tool to calculate a torque of a driving point and the driving point ratio (1/λ max) as a final result. Furthermore, current order values of the d-axis and the q-axis are extracted from the torque of the driving point and the driving point ratio.

In addition, the Id and Iq regions depending on each driving point ratio are extracted using the map extracting tool, and Id and Iq values having the smallest current magnitude satisfying a current limitation equation among Id and Iq values that each torque curve meets are used as table values of the current order generator. The map is automatically extracted through this process, thereby making it possible to generate the magnetic flux-based current order map.

Therefore, since the output voltage of the battery is reflected in a current order map input, a torque control procedure may be performed while reflecting a state of the vehicle in real-time. As a result, an optimal current order value is generated.

The iron loss torque compensator 110 extracts the iron loss torque compensation value for the generated d-axis and q-axis current orders Idref and Iqref and the speed Wrpm of the driving motor. That is, the iron loss torque compensator 110 generates a compensation torque Tcomp using three input variables. A method for extracting the iron loss torque compensation value will be described later in detail with reference to FIG. 2.

The current controller 120 converts the d-axis and q-axis current orders Idref and Iqref into the d-axis and q-axis voltage orders Vdref and Vqref. The 2/3 coordinate converter 130 is disposed between the current controller 120 and the PWM controller 140 and converts a synchronous frame voltage order into a rest frame voltage order based on a phase value estimated from a position of a rotor. Here, the 2/3 coordinate converter 130 may be called a synchronous coordinate inverter or a d-q/three-phase coordinate converter.

In addition, the 2/3 coordinate converter 130 converts the rest frame voltage order so as to be appropriate for a form of a motor to be driven and outputs the converted voltage order. For example, in the case of a three-phase motor, the 2/3 coordinate converter 130 converts the rest frame voltage order into a three-phase voltage order and outputs the three-phase voltage order to the PWM controller 140.

The PWM controller 140 synthesizes effective voltage vectors that may be output from an inverter during a control period Ts to generate a control signal so as to follow the voltage order and outputs the generated control signal to the inverter. In a case in which the inverter is formed of a switching device, such as an insulated gate bipolar transistor (IGBT), the control signal becomes a gate signal.

In addition, the PWM controller 140 calculates a voltage modulation index from the voltage order and a direct current (DC) link voltage and compares the calculated voltage modulation index with a preset reference modulation index. In addition, the PWM controller 140 selects any one of a plurality of modulation schemes depending on a result of the comparison and generates the control signal depending on the selected modulation scheme.

The 3/2 coordinate converter 150 converts a current detected by a current detecting unit (not shown) into a synchronous d-axis current and a synchronous q-axis current. For the purposes of the present disclosure, the 3/2 coordinate converter 150 may be called a synchronous coordinate phase converter or a three-phase/d-q coordinate converter.

The current controller 120, the 2/3 coordinate converter 130, the PWM controller 140 or the inverter, the 3/2 coordinate converter 150, and the like, have been briefly described above in the present specification.

Figure 2:
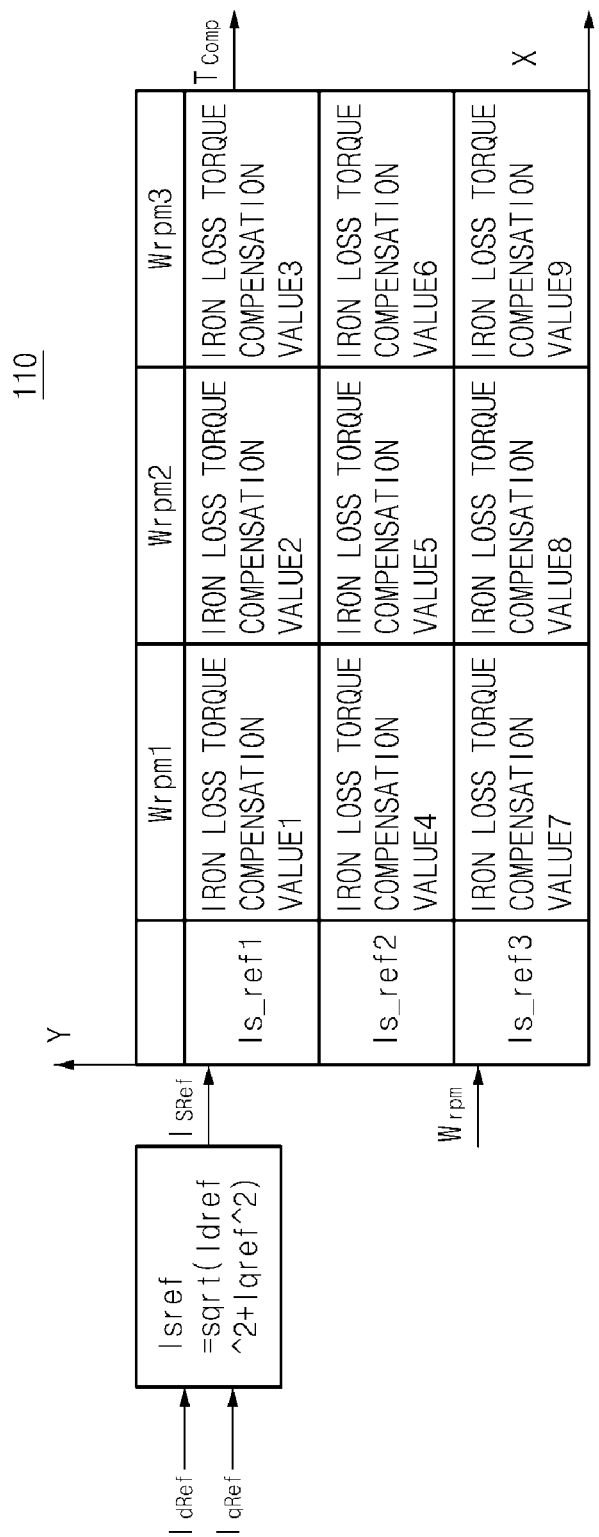
FIG. 2 is a diagram for describing compensation of a torque for a speed and a current driving point of the driving motor according embodiments of the present disclosure.

FIG. 2 is a diagram for describing compensation of a torque for a speed and a current driving point of the driving motor according to embodiments of the present disclosure.

Referring to FIG. 2, the iron loss torque compensator 110 extracts the iron loss torque compensation value for the generated d-axis and q-axis current orders Idref and Iqref and the speed Wrpm of the driving motor. The current orders Idref and Iqref may be called current driving points. In addition, the iron loss torque compensation value means the compensation torque Tcomp.

In detail, the iron loss torque compensator 110 may generate the current order (i.e., current driving point) calculated depending on a current magnitude (i.e., the sum of the square of the d-axis current order and the square of the q-axis current order), and then extract a plurality of iron loss torque compensation values corresponding to the current driving point depending on the current magnitude and the speed of the driving motor.

For example, an X-axis indicates a magnitude of the speed of the driving motor, and a Y-axis indicates a current magnitude in each current driving point. That is, the iron loss torque compensator 110 may extract the plurality of iron loss torque compensation values (i.e., iron loss torque compensation values 1 to 9) depending on the magnitudes (e.g., Is_ref1, Is_ref2, Is_ref3, and the like) of the current driving point and the speeds (e.g., Wrpm1, Wrpm2, Wrpm3, and the like) of the driving motor.

Figure 3A:
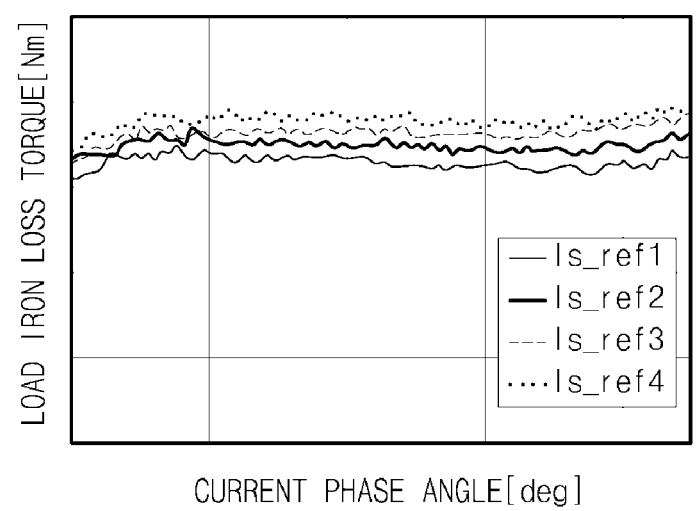
FIGS. 3A to 3C are graphs for describing compensation of a torque depending on a current phase angle, a current magnitude, and the speed of the driving motor according to embodiments of the present disclosure.
Figure 3B:
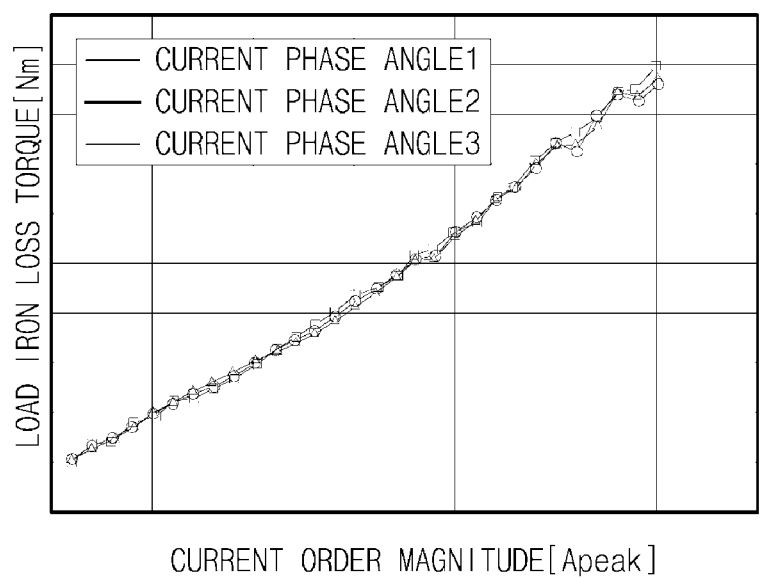
Figure 3C:
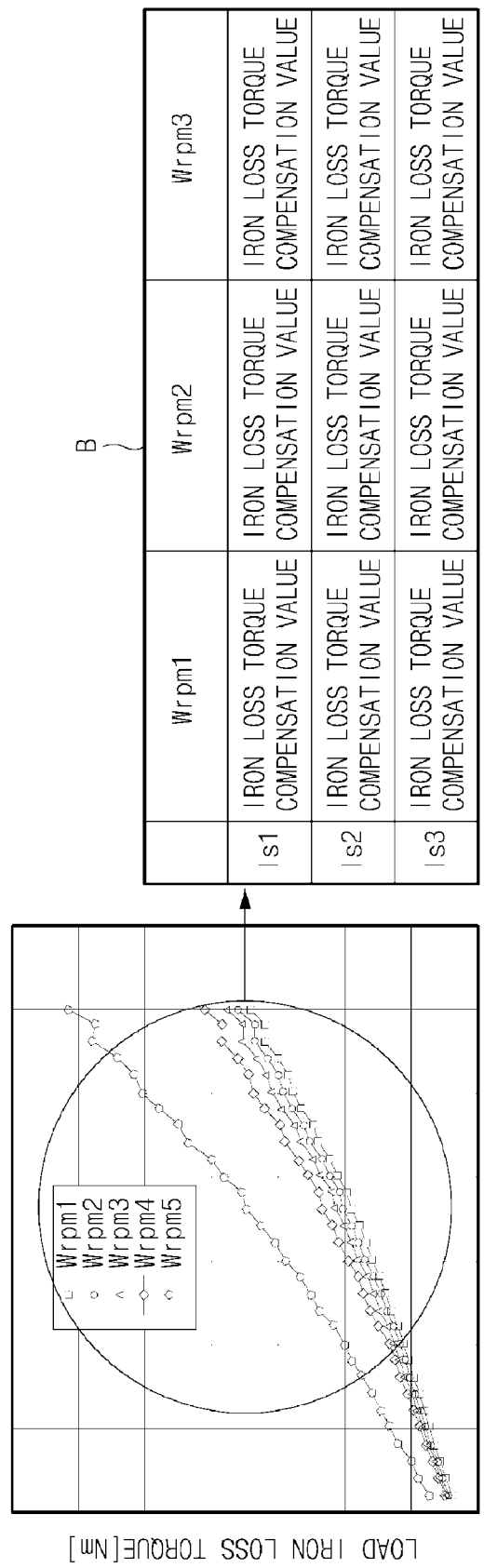

FIGS. 3A to 3C are graphs for describing compensation of a torque depending on a current phase angle, a current magnitude, and the speed of the driving motor according to embodiments of the present disclosure.

Referring to FIGS. 3A to 3C, FIG. 3A shows an iron loss torque compensation value depending on the current phase angle, wherein an X-axis indicates the current phase angle and a Y-axis indicates a load iron loss torque. That is, a difference is hardly present among current magnitudes (e.g., Is_ref1, Is_ref2, Is_ref3, and Is_ref4) depending on the X-axis and the Y-axis.

FIG. 3B shows an iron loss torque compensation value depending on the current magnitude, wherein an X-axis indicates the current magnitude of the current order and a Y-axis indicates a load iron loss torque. That is, a difference is hardly present between current phase angles depending on the X-axis and the Y-axis.

FIG. 3C shows an iron loss torque compensation value depending on the speed of the driving motor, wherein an X-axis indicates the current magnitude of the current order and a Y-axis indicates a load iron loss torque. Here, as shown in B enlarging FIG. 3C, the iron loss torque compensation value may be calculated depending on the speed of the driving motor and the current magnitude of the current order.

Figure 4A:
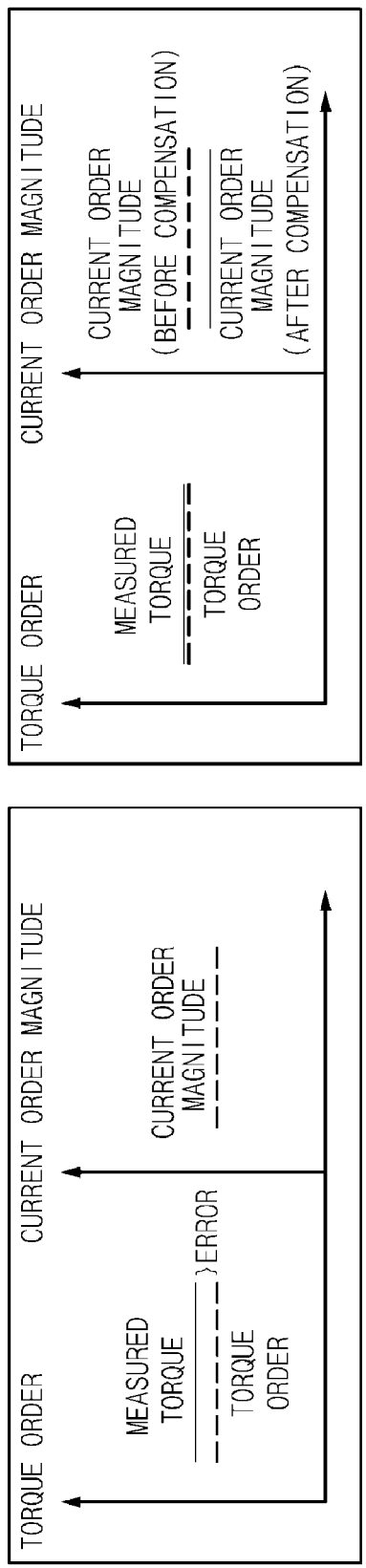
FIGS. 4A to 4C are diagrams showing a difference between measured torques before and after compensation of the torque depending on the speed of the driving motor and the current magnitude according to embodiments of the present disclosure.
Figure 4B:
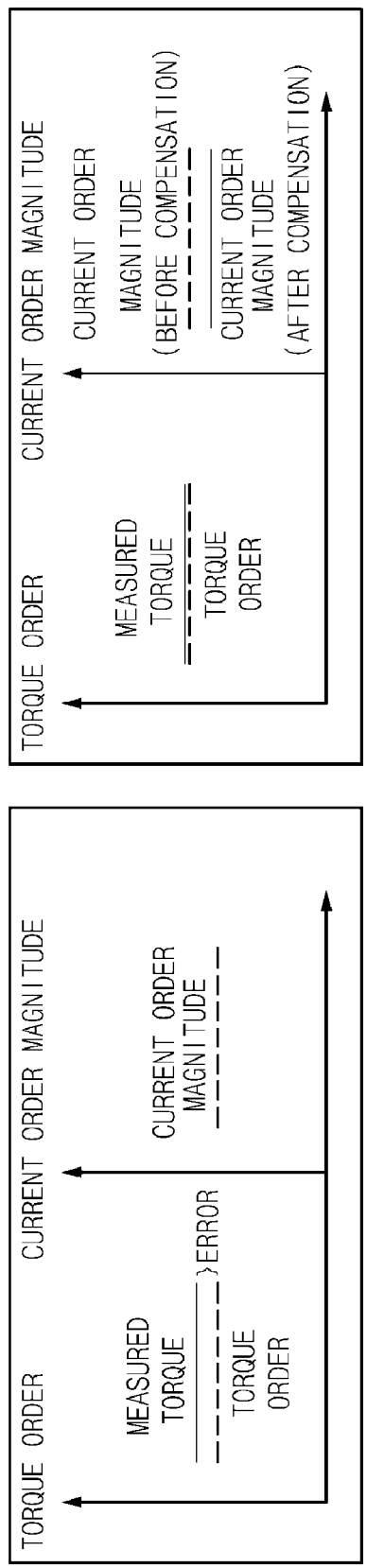
Figure 4C:
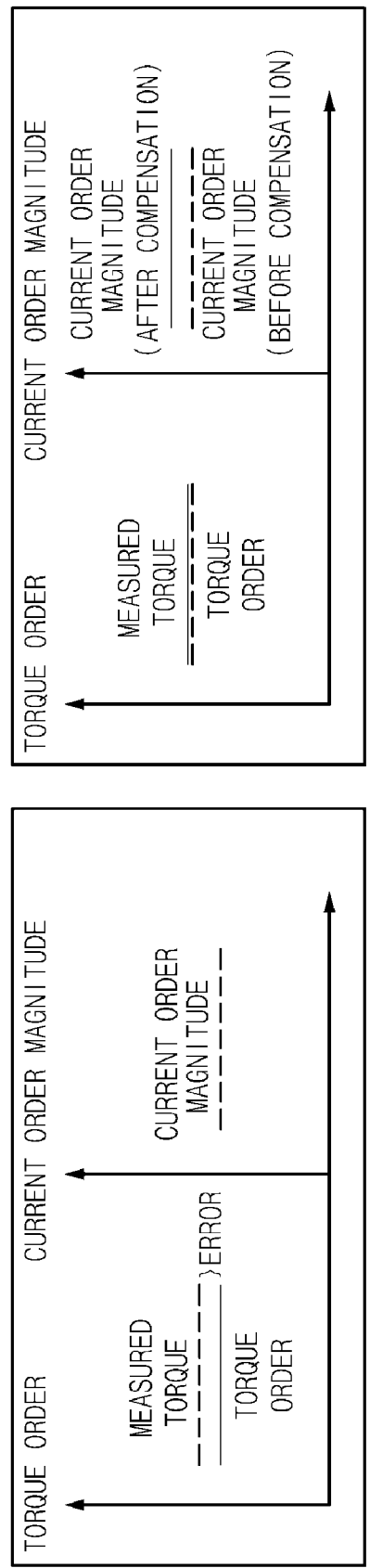

FIGS. 4A to 4C are diagrams showing a difference between measured torques before and after compensation of the torque depending on the speed of the driving motor and the current magnitude in the iron loss torque compensator according to embodiments of the present disclosure.

Referring to a left drawing of FIG. 4A, which is a graph showing an error between a measured torque value and a torque order value at the time of an increase in a battery voltage before the compensation of the iron loss torque, the measured torque value is larger than the torque order value. Referring to a right drawing of FIG. 4A, which is a graph showing an error between a measured torque value and a torque order value at the time of an increase in a battery voltage after the compensation of the iron loss torque, the measured torque value is substantially the same as the torque order value.

Referring to a left drawing of FIG. 4B, which is a graph showing an error between a measured torque value and a torque order value at the time of a decrease in a temperature of the driving motor before the compensation of the iron loss torque, the measured torque value is larger than the torque order value. Referring to a right drawing of FIG. 4B, which is a graph showing an error between a measured torque value and a torque order value at the time of a decrease in a temperature of the driving motor after the compensation of the iron loss torque, the measured torque value is substantially the same as the torque order value.

Referring to a left drawing of FIG. 4C, which is a graph showing an error between a measured torque value and a torque order value at the time of an increase in a speed of the driving motor before the compensation of the iron loss torque, the torque order value is larger than the measured torque value. Referring to a right drawing of FIG. 4C, which is a graph showing an error between a measured torque value and a torque order value at the time of an increase in a speed of the driving motor after the compensation of the iron loss torque, the measured torque value is substantially the same as the torque order value.

As set forth above, the techniques disclosed herein may minimize the error of the measured torque against the torque order for the speed and the temperature of the driving motor and the battery voltage. In addition, the present techniques may decrease a time required for preparing a torque compensation table depending on a speed. Further, the present techniques minimize the error of the measured torque for the temperature of the driving motor and the battery voltage, thereby making it possible to decrease current consumption of the battery and improve fuel efficiency of the vehicle.

Hereinabove, although the present disclosure has been described with reference to particular configurations and the accompanying drawings, the present disclosure is not limited thereto, but may be variously modified and altered by those skilled in the art to which the present disclosure pertains without departing from the spirit of the present disclosure and equivalents to the following claims.

What is claimed is:

1. A method for controlling torque of a driving motor, comprising:
    receiving, at a control circuit unit, an output voltage (Vdc) of a battery providing driving power of the driving motor, an electrical angular velocity (Wr) of the driving motor, and a torque order (Tref*);
    generating, by the control circuit unit, a driving point ratio (1/λmax) from the received output voltage of the battery and the received electrical angular velocity of the driving motor;
    generating, by a current order generator, a current order according to a sum of a square of a d-axis current order and a square of a q-axis current order, using a magnetic flux-based current order map including the torque order and the generated driving point ratio; and
    generating, by an iron loss torque compensator, a compensation torque order (Tcomp) using the generated current order and a speed (Wrpm) of the driving motor.

2. The method according to claim 1, further comprising:
    generating a voltage order from the generated current order.

3. The method according to claim 2, further comprising:
    feeding-back the generated voltage order to reflect the generated voltage order in the generating of the driving point ratio (1/λmax).

4. The method according to claim 1, wherein the generated current order is calculated based on a current magnitude.

5. The method according to claim 1, further comprising:
    generating the current order using a magnetic flux-based current order map including the generated compensation torque order and the generated driving point ratio.

* * * * *